(12) United States Patent
Zhan (10) Patent No.: US 8,842,334 B2
(45) Date of Patent: Sep. 23, 2014

(54) MAINTAINING PRINT SETTINGS ACROSS MULTIPLE APPLICATIONS

(75) Inventor: Xiaonong Zhan, Foster City, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 809 days.

(21) Appl. No.: 12/828,197

(22) Filed: Jun. 30, 2010

(65) Prior Publication Data

US 2012/0002221 A1    Jan. 5, 2012

(51) Int. Cl.
*G06F 15/00* (2006.01)
*G06F 3/12* (2006.01)

(52) U.S. Cl.
CPC ............ *G06F 3/1204* (2013.01); *G06F 3/1285* (2013.01); *G06F 3/1254* (2013.01)
USPC ............................. 358/1.9; 358/1.13; 358/1.15

(58) Field of Classification Search
None
See application file for complete search history.

(56) References Cited

U.S. PATENT DOCUMENTS

| | | | |
|---|---|---|---|
| 6,999,188 B1 | 2/2006 | Ashe | |
| 2003/0055776 A1* | 3/2003 | Samuelson | 705/37 |
| 2004/0257605 A1* | 12/2004 | Hayashi | 358/1.14 |
| 2005/0134891 A1* | 6/2005 | Ishizaki | 358/1.13 |
| 2005/0134910 A1* | 6/2005 | Kim et al. | 358/1.15 |
| 2006/0023246 A1* | 2/2006 | Vidyanand | 358/1.13 |
| 2006/0236091 A1* | 10/2006 | Kaji et al. | 713/150 |
| 2008/0010351 A1* | 1/2008 | Wardhaugh et al. | 709/206 |
| 2009/0135444 A1* | 5/2009 | Best et al. | 358/1.15 |
| 2009/0237691 A1* | 9/2009 | Kanamori | 358/1.9 |
| 2010/0037286 A1* | 2/2010 | Cain | 726/1 |
| 2010/0238499 A1* | 9/2010 | Wakui et al. | 358/1.15 |
| 2010/0271661 A1* | 10/2010 | Ogino | 358/1.15 |

* cited by examiner

*Primary Examiner* — Mark Zimmerman
*Assistant Examiner* — Helen Q Zong
(74) *Attorney, Agent, or Firm* — Osha Liang LLP (57) ABSTRACT

A method, including: receiving a request to print a first document from a first application; displaying print settings and an option to maintain print settings (MPS); collecting a time limit, a selection enabling the option to MPS, and a selection enabling a print setting; sending a first print job corresponding to the first document and the print setting to a printer; initiating, in response to the selection enabling the option to MPS, a time window having a duration set to the time limit; receiving a request to print a second document from a second application; identifying a remaining time of the time window; retrieving, in response to the remaining time exceeding zero, the indication of the print setting; and sending, bypassing the printer driver GUI, a second print job corresponding to the second document and the print setting to the printer.

20 Claims, 4 Drawing Sheets

MAINTAINING PRINT SETTINGS ACROSS MULTIPLE APPLICATIONS

BACKGROUND

As printers become increasingly sophisticated, users are provided with more and more printing options. A user may print a document according to default set of print options, or may change the print settings from the default values to specify custom print settings. Print options/settings include, for example, number of copies to print, print quality, print sizing/scaling, print order, color printing, and the like.

Similarly, as computers become increasingly sophisticated, users are provided with more and more software applications (e.g., word processing applications, spreadsheet applications, Internet browsers, desktop publishing applications, etc.) from which documents can be printed. Once the user specifies the custom/desired print settings for a printer driver within a software application, the user can repeatedly use the custom print settings for the printer driver within the software application (i.e., the user does not have to re-specify the custom print settings within the software application). However, when the user attempts to print from a different software application, the custom/desired print settings must be specified again. In other words, the different software applications do not share the custom print settings selected by the user.

SUMMARY

In general, in one aspect, the invention relates to a method for maintaining print settings across applications. The method comprises: receiving a request to print a first document from a first application operated by a user; displaying, within a printer driver graphical user interface (GUI), a plurality of print settings and an option to maintain print settings (MPS); collecting, by a printer driver and using the printer driver GUI, a time limit from the user, a selection enabling the option to MPS from the user, and a selection enabling a print setting of the plurality of print settings from the user; sending a first print job corresponding to the first document and the print setting to a printer; initiating, by the printer driver and in response to the selection enabling the option to MPS, a time window having a duration set to the time limit; storing, by printer driver, an indication of the print setting in response to the selection enabling the option to MPS; receiving, after storing the indication, a request to print a second document from a second application of the plurality of applications; identifying, by the printer driver, a remaining time of the time window; retrieving, by the printer driver and in response to the remaining time exceeding zero, the indication of the print setting; and sending, after retrieving the indication of the print setting, a second print job corresponding to the second document and the print setting to the printer.

In general, in one aspect, the invention relates to a computer readable storage medium storing instructions for maintaining print settings across applications. The instructions comprises functionality to: receive a request to print a first document from a first application operated by a user; display, within a printer driver graphical user interface (GUI), a plurality of print settings and an option to maintain print settings (MPS); collect, using the printer driver GUI, a time limit from the user, a selection enabling the option to MPS from the user, and a selection enabling a print setting of the plurality of print settings from the user; send a first print job corresponding to the first document and the print setting to a printer; initiate, in response to the selection enabling the option to MPS, a time window having a duration set to the time limit; store an indication of the print setting in response to the selection enabling the option to MPS; receiving, after storing the indication, a request to print a second document from a second application of the plurality of applications; identifying a remaining time of the time window; retrieving, in response to the remaining time exceeding zero, the indication of the print setting; and sending, after retrieving the indication of the print setting, a second print job corresponding to the second document and the print setting to the printer.

In general, in one aspect, the invention relates to a system for maintaining print settings across applications. The system comprises: a hardware processor; a memory operatively connected to the hardware processor; and a plurality of software instructions stored within the memory and comprising functionality to: receive a request to print a first document from a first application operated by a user; display, within a printer driver graphical user interface (GUI), a plurality of print settings and an option to maintain print settings (MPS); collect, using the printer driver GUI, a time limit from the user, a selection enabling the option to MPS from the user, and a selection enabling a print setting of the plurality of print settings from the user; send a first print job corresponding to the first document and the print setting to a printer; initiate, in response to the selection enabling the option to MPS, a time window having a duration set to the time limit; store an indication of the print setting in response to the selection enabling the option to MPS; receiving, after storing the indication, a request to print a second document from a second application of the plurality of applications; identifying a remaining time of the time window; retrieving, in response to the remaining time exceeding zero, the indication of the print setting; and sending, after retrieving the indication of the print setting, a second print job corresponding to the second document and the print setting to the printer.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for maintaining printer settings across multiple software applications. Following a request to print a page from a first application, a user may be presented with the option to maintain print settings (MPS). If the option to MPS is invoked (i.e., selected by the user), any print settings specified for the print request from the first application will be applied to any subsequent print requests from other applications. In one embodiment, the option to MPS remains invoked for a limited time (e.g., the duration of a time window set by the user).

Figure 1:
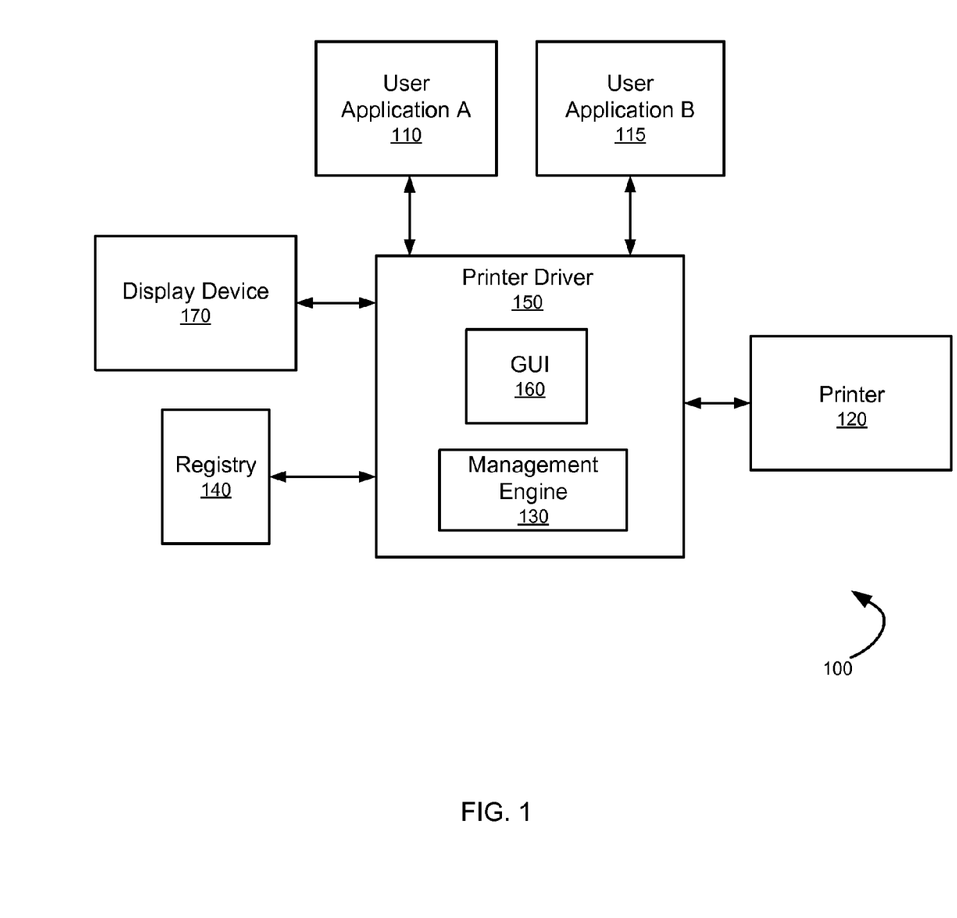
FIG. 1 shows a system in accordance with one or more embodiments of the invention.

FIG. 1 shows a system (100) in accordance with one or more embodiments of the invention. As shown in FIG. 1, the system (100) has multiple components including a user application A (110), a user application B (115), a printer (120), a registry (140), a printer driver (150), and a display device (170). Further, the printer driver (150) may include a graphic user interface (GUI) (160) and a management engine (130). Each of these components are described below and may be located on the same device (e.g., a server, mainframe, desktop PC, laptop, PDA, television, cable box, satellite box, kiosk, telephone, mobile phone, etc.) or may be located on separate devices connected by a network (e.g., the Internet), with wired and/or wireless segments.

In one or more embodiments of the invention, the user applications A and B (110, 115) are software applications capable of sending print jobs (i.e., specific pages to be printed) to the printer (120). For example, user applications A and B (110, 115) may include word processing applications, image processing applications, operating systems, database applications, financial management applications, accounting applications, tax preparation applications, music composition applications, human resource (HR) applications, payroll applications, 401K management applications, etc. The printer (120) may be any type of printing device, such as a laser printer, an ink-jet printer, a dot-matrix printer, a pen plotter, a dye-sublimation printer, a thermal printer, and the like.

In one or more embodiments of the invention, the GUI (160) enables a user to configure print settings for the printer (120). Specifically, the user may interact with the GUI (160) to configure the printer driver (150), and thereby specify print settings for any print jobs sent from the user applications A and B (110, 115) to the printer (120). For example, the user may specify print settings such as, paper type, paper source, pages to be printed, number of copies to print, print quality, print sizing/scaling, double-sided printing, N-up printing, collating, color printing, print order, and the like. Further, the user may set the print settings, at least in part, through interaction with graphical elements of the GUI (160) (e.g., pushing buttons, selecting menu items, selecting radio buttons, clicking icons, checking boxes, etc.).

In one or more embodiments of the invention, a user may select an option to maintain print settings (MPS), meaning that any print settings specified in one user application are maintained and applied to other user applications. Further, in one or more embodiments, the user may select the option to MPS by interacting with the GUI (160). For example, assume a user creates a print job within user application A (110) by issuing a command to print a document. Further, assume that the user specifies print settings for the print job created within user application A (110), and also selects the option to MPS. Finally, assume the user creates a print job within user application B (115). In such a situation, the print settings specified in user application A (110) may be automatically applied to the print job created within user application B (115).

In one or more embodiments of the invention, the duration of the option to MPS may be limited to a time window. For example, the GUI (160) may be configured to enable a user, upon selecting the option to MPS, to also specify a time window during which the option to MPS is active. In one embodiment, the time window may be specified as a time limit (i.e., a period of time beginning at the present time). Alternatively, the time window may be specified by any other technique. For example, the time window may be specified by a starting date/time and an ending date/time. In one or more embodiments, the time window may be specified in any time unit (e.g., seconds, minutes, hours, days, weeks, etc.). For the sake of brevity, the time window for the option to MPS may be referred to herein as the "MPS time window." After the expiration of the MPS time window, the print settings are no longer maintained, and are no longer applied to subsequent print requests.

In one or more embodiments, an option to MPS may be terminated before the expiration of the MPS time window. For example, the user may interact with the GUI (160) to issue a command (e.g., select a menu option, click a button, etc.) to terminate the option to MPS. In another example, the user may terminate the option to MPS by manually changing the MPS time window start/finish values within the GUI (160). In yet another example, the option to MPS may be terminated in response to the user changing any print settings in the GUI (160).

In one or more embodiments of the invention, print settings, the option to MPS, and/or the MPS time window are stored in the registry (140). Alternatively, print settings, the option to MPS, and/or the MPS time window may be stored in any other data structure or storage location (e.g., RAM memory, hard drive, database, text file, XML metadata, and the like). In one or more embodiments of the invention, the management engine (130) provides a link between the user applications A and B (110, 115), printer (120), registry (140), printer driver (150), and display device (170). In particular, the management engine (130) may be configured to convert data or commands from one format to another format in order to render the components (110, 115, 120, 140, 150, 170) compatible with each other.

Note that the system (100) is provided for illustrative purposes only, and is not intended to limit embodiments of the invention. In particular, a person of skill in the art will appreciate that the system (100) may be configured in a different manner that shown in FIG. 1. Further, any of the functionality described above with regard to system (100) may be performed by any number of elements of system (100), whether alone or in combination. For example, the maintenance of print settings may be performed by the print driver (150), by the management engine (130), by any another element of system (100), or any combination of the above. In another example, the system (100) may include any number of user applications in addition to user applications A and B (110, 115). In yet another example, the GUI (160) may be included in the management engine (130), or may be configured as a separate software module.

Figure 2:
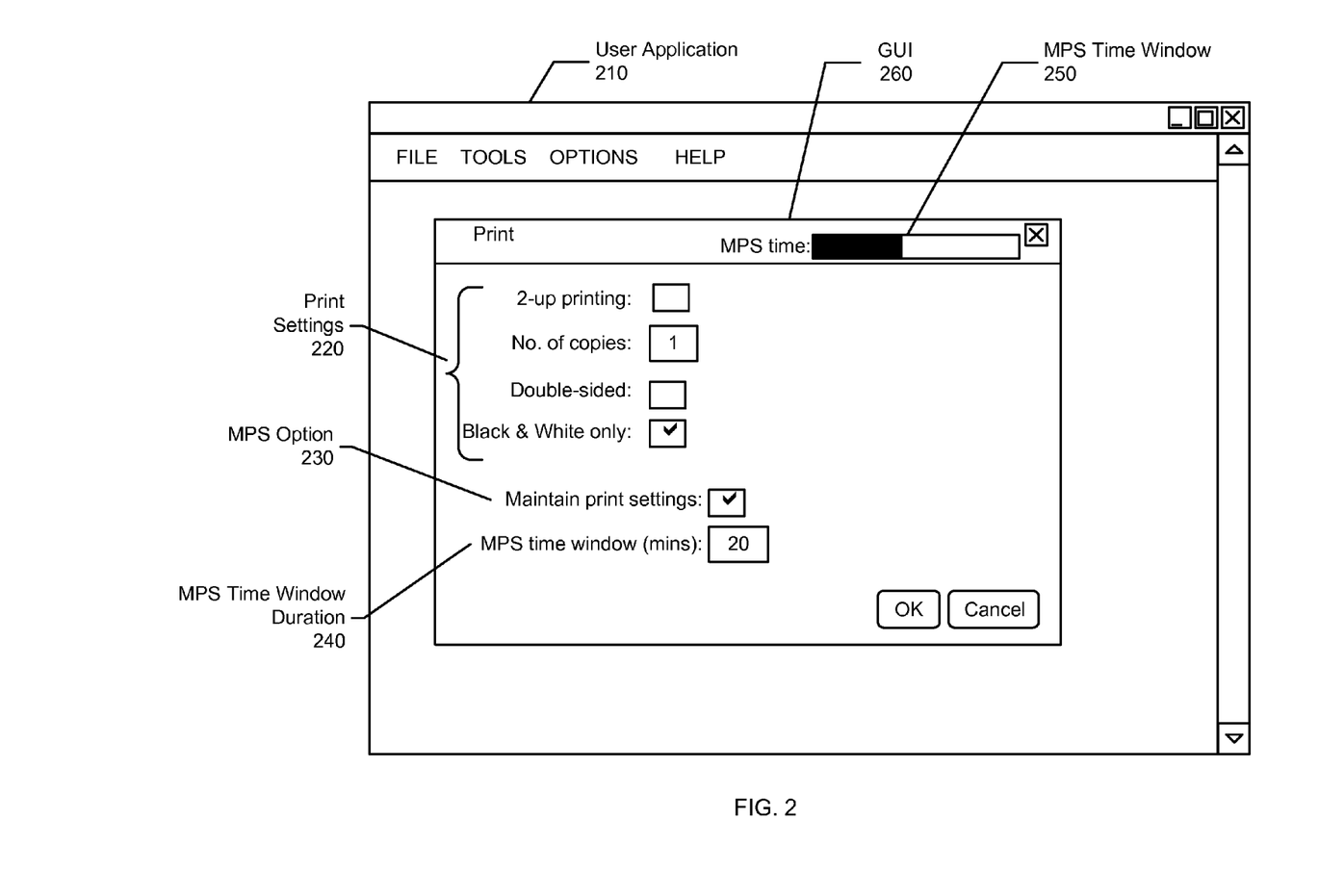
FIG. 2 shows an example of a user interface in accordance with one or more embodiments of the invention.

FIG. 2 shows a GUI (260) in accordance with one or more embodiments of the invention. The GUI (260) may be essentially the same as the GUI (160), discussed above in reference to FIG. 1. As shown in FIG. 2, the GUI (260) may be presented as a dialog box within a window (210) corresponding to a user application (e.g., user application A (110), discussed above in reference to FIG. 1). Alternatively, the GUI (260) may be shown by other user interface techniques, such as a stand-alone window. In one embodiment, the GUI (260) may include multiple graphical elements for configuring print settings (220). Specifically, each graphical element may enable a user to configure/select one or more print settings (e.g., number of copies to print, double-sided printing, 2-up printing, black-only printing, etc.).

As shown in FIG. 2, in one or more embodiments, the GUI (260) includes a graphical element for selecting an option to MPS (230) and a graphical element for specifying an MPS time window (240). Note that, in the example shown in FIG. 2, the graphical element for selecting an option to MPS (230) is shown as a checkbox, and the graphical element for specifying a MPS time window (240) is shown as a text box.

In one or more embodiments of the invention, the GUI (260) displays a graphical representation of the MPS time window (250). The graphical representation of the MPS time window (250) displays the remaining time during which the MPS option remains invoked. As shown in FIG. 2, the graphical representation of the MPS time window (250) may correspond to a bar (e.g., a progress bar). Alternatively, the graphical representation of the MPS time window (250) may be displayed in a taskbar of a GUI desktop.

In one or more embodiments, the user interacts with the GUI (260) in order to deactivate MPS. For example, the user may interact with the graphical element for selecting an option to MPS (230) to indicate that MPS is no longer desired (e.g., deselect the checkbox). In one or more embodiments, the indication that the invoked MPS option is no longer desired may cause the MPS time window to close. Further, in one or more embodiments, the user interacts with the graphical element for specifying an MPS time window (240) to indicate that the MPS time window is closed (e.g., specify a time limit of zero minutes, specify the same start time and finish time, etc.). In one or more embodiments, an indication that the MPS time window is closed may cause MPS to be deactivated.

Of course, one of ordinary skill in the art will appreciate that the graphical representation shown in FIG. 2 is provided for the sake of illustration, and is not intended to limit embodiments of the invention. For example, the graphical element for selecting an option to MPS (230) may be any graphical control, such as a radio button, pull-down menu, on/off buttons, and the like. In another example, the graphical element for specifying a MPS time window (240) may be start/end text fields, calendars, clock displays, pull-down menus, or any other technique for specifying a time window. In yet another example, the graphical representation of the MPS time window (250) may be any representation of time (e.g., a clock, a numeric display, a pie chart, an hourglass, and the like), and may be shown in any part of the window (210), the GUI (260), or any other element shown in the display device (170), discussed above in reference to FIG. 1.

Figure 3:
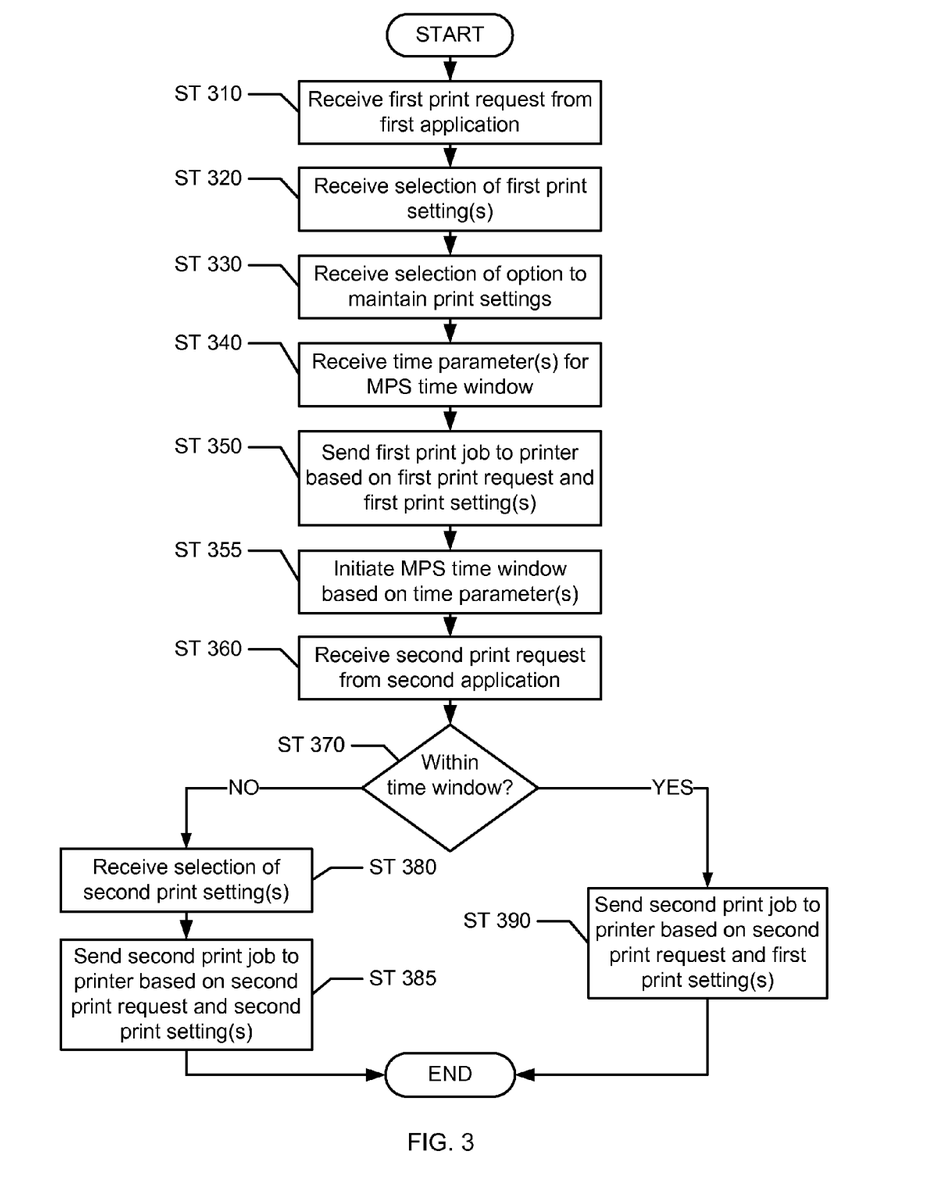
FIG. 3 shows a flow chart in accordance with one or more embodiments of the invention.

FIG. 3 shows a flowchart in accordance with one or more embodiments of the invention. The process shown in FIG. 3 may be used to maintain print settings across multiple applications, and can be carried out by the functionalities of the printer driver (150), typically. Further, the process shown in FIG. 3 may be implemented to the system (100), discussed above in reference to FIG. 1, and/or the GUI (260), discussed above in reference to FIG. 2. The process shown in FIG. 3 may be carried out by a central processing unit (CPU) of the printer 100 using a software program stored in a memory, such as a read only memory (ROM) or hard disk drive (HDD). Those skilled in the art, having the benefit of this detailed description, will appreciate that the sequence of steps shown in FIG. 3 may differ among embodiments of the invention, and that one or more of the steps shown in FIG. 3 may be omitted, repeated, performed in parallel, and/or performed in a different order. Accordingly, the specific arrangement of steps shown in FIG. 3 should not be construed as limiting the scope of the invention.

At ST 310, a first print request is received from a first application. For example, referring to FIG. 1, the management engine (130) may receive a print request from user application A (110). The first print request may be generated, e.g., by a user issuing a command to print a document within user application A (110).

At ST 320, a selection of first print setting(s) may be received. For example, assume that, after issuing a command to print a document within user application A (110), the user is presented with the GUI (260) of the printer driver (150). Referring now to FIG. 2, assume further that the user interacts with at least one of the graphical elements for configuring print settings (220) included in the GUI (260), and has thus specified at least one print setting for the first print request (received at ST 310). In other words, the user may change print settings from the default values to desired values. In one or more embodiments, the print setting(s) specified by the user may then be received by the management engine (130), discussed above in reference to FIG. 1.

At ST 330, a selection of the option to MPS is received. For example, referring again to FIG. 2, assume that the user interacts with the graphical element for selecting an option to MPS (230), and thus invokes the option to MPS. In one or more embodiments, the selection of the option to MPS may then be received by the management engine (130). As discussed above, in one or more embodiments, selecting the option to MPS results in the print setting(s) corresponding to the current print request being maintained for use in subsequent print requests. In one or more embodiments, the printer driver (150) may be configured to, in response to the selection of the option to MPS, store an indication of the print setting(s) (received at ST 320) in the registry (140). Alternatively, the indication of the print setting(s) may be stored on a hard disk.

At ST 340, a time parameter(s) defining an MPS time window is received. For example, referring again to FIG. 2, assume that the user interacts with the graphical element for specifying an MPS time window (240), and thus specifies the time parameter(s) for the MPS time window. In one or more embodiments, the time parameter(s) for the MPS time window may then be received by the management engine (130).

At ST 350, a first print job is sent to the printer. In one or more embodiments, the first print job may be based on the first print request (received at ST 310) and the first print settings (received at ST 320). For example, referring to FIG. 1, the management engine (130) may send a print job to the printer (120). At ST 355, an MPS time window may be initiated based on the time parameter(s) (received at 340). Further, the printer driver (150) may initiate the MPS time window based on the time parameter(s). As discussed above, in one or more embodiments, the MPS time window defines the time period during which the option to MPS is active.

At ST 360, a second print request is received from a second application. For example, referring to FIG. 1, the management engine (130) may receive a print request from user application B (115). The second print request may be generated, e.g., by a user issuing a command to print a document within user application B (115).

At ST 370, it is determined whether the second print request (received at ST 360) was received within the MPS time window (received at ST 340). For example, referring to FIG. 1, the printer driver (150) may be configured to determine if a print request is received within an MPS time window (initiated at ST 355). If it is determined at ST 370 that the second print request was received within the MPS time window, then at ST 390, the management engine (130) displays a GUI to the user (e.g., GUI (260), discussed above in reference to FIG. 2). When displaying the GUI, print setting(s) specified and used in the first print request may be retrieved from the registry. The graphical elements may be set to reflect the retrieved print setting(s). The user may then interact with the GUI (260) in order to deactivate the option to MPS. For example, referring to FIG. 2, the user may interact with the graphical element for selecting an option to MPS (230) to indicate that the invoked MPS option is no longer desired (e.g., deselect the checkbox). In one or more embodiments, an indication that the option to MPS is no longer selected may cause the MPS time window (240) to be closed or grayed out from GUI (260). Alternatively, in one embodiment, the user interacts with the graphical element for specifying a MPS time window (240) to indicate that the MPS time window is closed (e.g., specify a time limit of zero minutes, specify the same start time and finish time, etc.). In one or more embodiments, the indication that the MPS time window is closed causes MPS to be deactivated. In one or more embodiments, in response to such inactivation of MPS time window (240), the print setting(s) stored in the registry (140) are reset, erased, or invalidated by the management engine (130). In one or more embodiments, the print setting(s) represented by the graphical elements for configuring print settings (220) are kept regardless of the inactivation of the MPS time window, or alternately may be reset to the default settings in response to the inactivation of MPS time window.

The content(s) of the print setting(s) for a second print job, based on the second print request (received at ST 360) will vary depending on the user operation of the GUI (260). For instance, in case where the user does not change anything from the GUI (260), the second print job with the first print settings (received at ST 320), may be sent to the printer. Alternately, in case where the user changed the print setting (s) or deactivated the MPS time window, the second print job with newly designed print settings may be sent to the printer.

Though in the above explanation, GUI (260) is presented to the user in response to determining that the second print request was received within the MPS time window (i.e., the option to MPS is still active), a GUI (e.g., GUI (260)) may be bypassed (i.e., not displayed to the user). In other words, because the option to MPS is active, the print request will be processed according to the first print settings (received at ST 320), and the user is not prompted with the GUI to specify print settings for the second print request.

In one or more embodiments, the print job may include a page image generated by rasterizing a page of the print request according to the print settings. Further, in one or more embodiments, the print job may be composed from page descriptor language (PDL) commands. After ST 390, the process ends.

However, if it is determined at ST 370 that the second print request was received after the MPS time window (i.e., the option to MPS is no longer active), then at ST 380, the management engine (130) may display a GUI to the user (e.g., GUI (260)) with the default settings, so that a new selection of second print setting(s) may be received from the user. For example, referring to FIG. 2, assume that the user is presented with the GUI (260), and that the user interacts with at least one of the graphical elements for configuring print settings (220), and has thus specified at least one print setting corresponding to the second print request (received at ST 360). At ST 385, a second print job, based on the second print request (received at ST 360) and the second print settings (received at ST 380), may be sent to the printer. For example, referring to FIG. 1, the printer driver (150) may be configured to compose a print job based on the second print request and the second print settings, and then send the print job to the printer (120). After ST 385, the process ends.

Embodiments of the present invention may include one or more of the following advantages: the ability to share custom print settings across multiple applications; the ability to set a time window during which the custom print settings are shared; and the ability to display the time window and alert the user when the time window is set to expire, etc.

Figure 4:
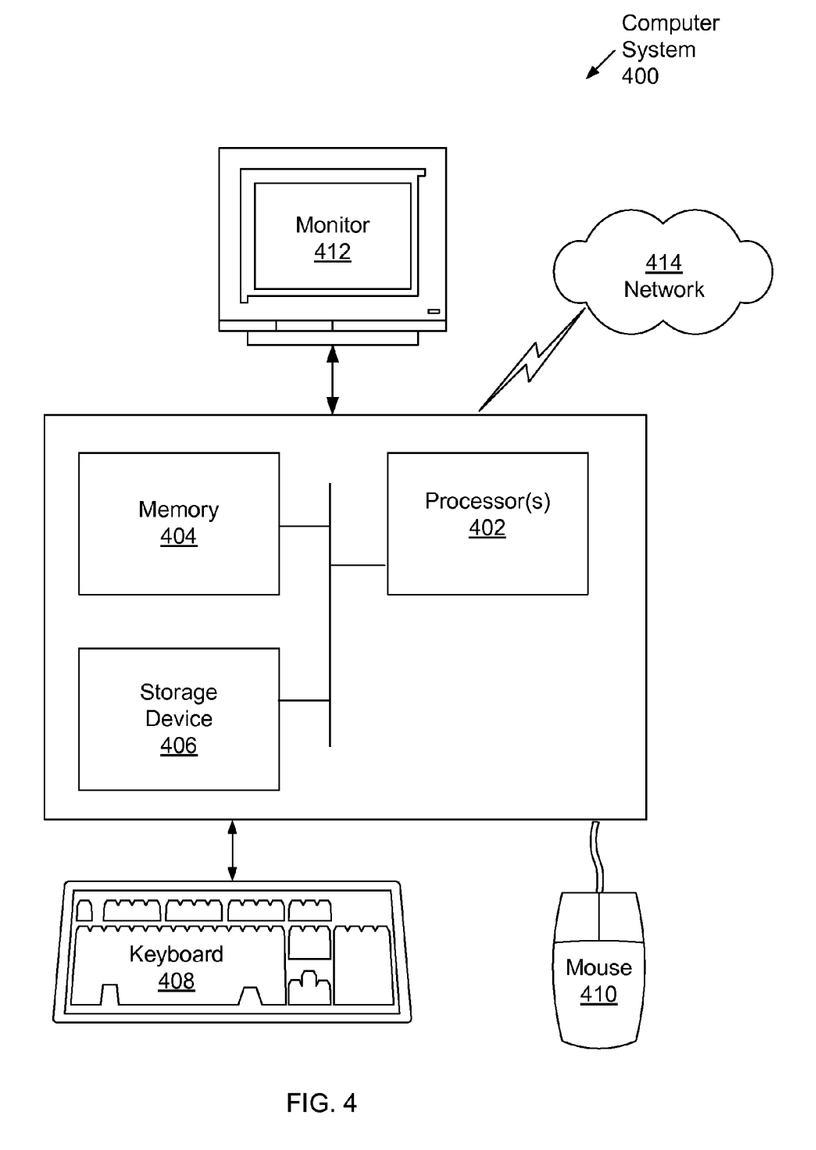
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processor(s) (402) (such as a central processing unit (CPU), integrated circuit, etc.), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN), the Internet, or any other type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, in one or more embodiments of the invention, one or more elements of the aforementioned computer system (400) may be located at a remote location and connected to the other elements over a network. Further, embodiments of the invention may be implemented on a distributed system having a plurality of nodes, where each portion of the invention (e.g., user application A (110), registry (140), management engine (150), etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible computer readable storage medium, such as a compact disc (CD), a diskette, a tape, punch cards, memory, or any other tangible computer readable storage device.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for maintaining print settings across applications, comprising:
   receiving a request to print a first document from a first application operated by a user;
   displaying, within a printer driver graphical user interface (GUI), a plurality of print settings and an option to maintain print settings (MPS);
   collecting, by a printer driver and using the printer driver GUI, a selection enabling the option to MPS from the user, a selection enabling a print setting of the plurality of print settings from the user, and a time limit from the user during which the option to MPS is active;

sending a first print job corresponding to the first document and the print setting to a printer;

initiating, by the printer driver and in response to the selection enabling the option to MPS, a time window having a duration set to the time limit;

storing, by the printer driver, an indication of the print setting in response to the selection enabling the option to MPS;

receiving, after storing the indication, a request to print a second document from a second application of the plurality of applications;

identifying, by the printer driver, a remaining time of the time window; and processing, by the printer driver and in response to the remaining time exceeding zero, the request to print the second document without displaying the printer driver GUI, wherein processing the request to print the second document comprises:

retrieving the indication of the print setting; and sending, after retrieving the indication of the print setting, a second print job corresponding to the second document and the print setting to the printer.

2. The method of claim 1, further comprising:
displaying a representation of the time window on the printer driver GUI.

3. The method of claim 1, further comprising:
receiving, before expiration of the time window, a request to access the printer driver;
displaying, in response to the request to access the printer driver, the printer driver GUI;
collecting, before expiration of the time window and using the printer driver GUI, a request to disable the option to MPS; and
terminating the time window.

4. The method of claim 1, further comprising:
receiving, before expiration of the time window, a request to access the printer driver;
displaying, in response to the request to access the printer driver, the printer driver GUI;
collecting, by the printer driver and using the printer driver GUI, a revised time limit; and
modifying the time window according to the revised time limit.

5. The method of claim 1, further comprising:
generating, by the printer driver, a plurality of page descriptor language (PDL) commands based on the print option and comprising a plurality of objects based on the first document, wherein the first print job comprises the plurality of PDL commands.

6. The method of claim 1, further comprising:
generating, by the printer driver, a page image by rasterizing the first document according to the print option, wherein the first print job comprises the page image.

7. The method of claim 1, wherein the indication of the print setting is stored by the printer driver in a registry and retrieved by the printer driver from the registry.

8. The method of claim 1, wherein the indication of the print setting is stored by the printer driver to a hard disk and retrieved by the printer driver from the hard disk.

9. A non-transitory computer readable storage medium storing instructions for maintaining print settings across applications, the instructions comprising functionality to:
receive a request to print a first document from a first application operated by a user;
display, within a printer driver graphical user interface (GUI), a plurality of print settings and an option to maintain print settings (MPS);
collect, using the printer driver GUI, a selection enabling the option to MPS from the user, a selection enabling a print setting of the plurality of print settings from the user, and a time limit from the user during which the option to MPS is active;
send a first print job corresponding to the first document and the print setting to a printer;
initiate, in response to the selection enabling the option to MPS, a time window having a duration set to the time limit;
store an indication of the print setting in response to the selection enabling the option to MPS;
receiving, after storing the indication, a request to print a second document from a second application of the plurality of applications;
identifying a remaining time of the time window; and
processing, in response to the remaining time exceeding zero, the request to print the second document without displaying the printer driver GUI, wherein processing the request to print the second document comprises:
retrieving the indication of the print setting; and
sending, after retrieving the indication of the print setting, a second print job corresponding to the second document and the print setting to the printer.

10. The non-transitory computer readable storage medium of claim 9, the instructions further comprising functionality to:
display a representation of the time window on the printer driver GUI.

11. The non-transitory computer readable storage medium of claim 9, the instructions further comprising functionality to:
receive, before expiration of the time window, a request to access the printer driver;
display, in response to the request to access the printer driver, the printer driver GUI;
collect, before expiration of the time window and using the printer driver GUI, a request to disable the option to MPS; and
terminate the time window.

12. The non-transitory computer readable storage medium of claim 9, the instructions further comprising functionality to:
receive, before expiration of the time window, a request to access the printer driver;
display, in response to the request to access the printer driver, the printer driver GUI;
collect, using the printer driver GUI, a revised time limit; and
extend the time window according to the revised time limit.

13. The non-transitory computer readable storage medium of claim 9, the instructions further comprising functionality to:
generate a plurality of page descriptor language (PDL) commands based on the print option and comprising a plurality of objects based on the first document, wherein the first print job comprises the plurality of PDL commands.

14. The non-transitory computer readable storage medium of claim 9, the instructions further comprising functionality to:
generate a page image by rasterizing the first document according to the print option, wherein the first print job comprises the page image.

15. The non-transitory computer readable storage medium of claim 9, wherein the indication of the print setting is stored by the printer driver in a registry and retrieved by the printer driver from the registry.

16. The non-transitory computer readable storage medium of claim 9, wherein the indication of the print setting is stored by the printer driver to a hard disk and retrieved by the printer driver from the hard disk.

17. A system for maintaining print settings across applications, comprising:
   a hardware processor;
   a memory operatively connected to the hardware processor; and
   a plurality of software instructions stored within the memory and comprising functionality to:
      receive a request to print a first document from a first application operated by a user;
      display, within a printer driver graphical user interface (GUI), a plurality of print settings and an option to maintain print settings (MPS);
      collect, using the printer driver GUI, a selection enabling the option to MPS from the user, a selection enabling a print setting of the plurality of print settings from the user, and a time limit from the user during which the option to MPS is active;
      send a first print job corresponding to the first document and the print setting to a printer;
      initiate, in response to the selection enabling the option to MPS, a time window having a duration set to the time limit;
      store an indication of the print setting in response to the selection enabling the option to MPS;
      receiving, after storing the indication, a request to print a second document from a second application of the plurality of applications;
      identifying a remaining time of the time window; and
      processing, in response to the remaining time exceeding zero, the request to print the second document without displaying the printer driver GUI, wherein processing the request to print the second document comprises:
         retrieving the indication of the print setting; and
         sending, after retrieving the indication of the print setting, a second print job corresponding to the second document and the print setting to the printer.

18. The system of claim 17, wherein the software instructions further comprise functionality to:
   receive, before expiration of the time window, a request to access the printer driver;
   display, in response to the request to access the printer driver, the printer driver GUI;
   collect, before expiration of the time window and using the printer driver GUI, a request to disable the option to MPS; and
   terminate the time window.

19. The system of claim 17, wherein the software instructions further comprise functionality to:
   receive, before expiration of the time window, a request to access the printer driver;
   display, in response to the request to access the printer driver, the printer driver GUI;
   collect, using the printer driver GUI, a revised time limit; and
   extend the time window according to the revised time limit.

20. The system of claim 17, wherein the software instructions further comprise functionality to:
   displaying a representation of the time window on the printer driver GUI.

\* \* \* \* \*